US008977479B2

(12) United States Patent
Yang et al.

(10) Patent No.: US 8,977,479 B2
(45) Date of Patent: Mar. 10, 2015

(54) METHOD AND APPARATUS FOR DETERMINING TRAFFIC CONDITIONS

(71) Applicant: Ford Global Technologies, LLC, Dearborn, MI (US)

(72) Inventors: Hsin-Hsiang Yang, Ann Arbor, MI (US); Kwaku O. Prakah-Asante, Commerce Township, MI (US); Fling Tseng, Ann Arbor, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/794,993

(22) Filed: Mar. 12, 2013

(65) Prior Publication Data

US 2014/0277823 A1    Sep. 18, 2014

(51) Int. Cl.
*G08G 1/00* (2006.01)
*B60T 8/1755* (2006.01)
*G08G 1/01* (2006.01)

(52) U.S. Cl.
CPC ............... *G08G 1/00* (2013.01); *B60T 8/17551* (2013.01); *G08G 1/0104* (2013.01)
USPC .................. 701/117; 701/1; 701/70; 701/118; 701/119; 340/907

(58) Field of Classification Search
CPC ........................................................ B60Q 1/00
USPC ........................................................ 707/705
See application file for complete search history.

(56) References Cited

U.S. PATENT DOCUMENTS

| 4,937,751 A | 6/1990 | Nimura et al. |
| 5,177,685 A | 1/1993 | Davis et al. |
| 5,220,507 A | 6/1993 | Kirson |
| 5,275,474 A | 1/1994 | Chin et al. |
| 5,291,412 A | 3/1994 | Tamai et al. |
| 5,351,779 A | 10/1994 | Yamashita |
| 5,394,332 A | 2/1995 | Kuwahara et al. |
| 5,406,491 A | 4/1995 | Lima |

(Continued)

FOREIGN PATENT DOCUMENTS

| CN | 1573296 | 2/2005 |
| DE | 102005029744 | 12/2006 |

(Continued)

OTHER PUBLICATIONS

International Searching Authority, International Search Report and the Written Opinion for the corresponding PCT Application No. PCT/US2009/69668 mailed Mar. 4, 2010.

(Continued)

*Primary Examiner* — Thomas Tarcza
*Assistant Examiner* — Tyler J Lee
(74) *Attorney, Agent, or Firm* — Jennifer M. Stec; Brooks Kushman P.C.

(57) ABSTRACT

A system includes a vehicle processor configured to detect one or more brake presses. The processor is also configured to detect one or more accelerator presses. Further, the processor is configured to add values related to the brake presses and accelerator presses to aggregate an index value based on detected brake and acceleration presses. The processor is additionally configured to enact a safety and convenience related measure based on the index value passing at least a first predetermined threshold.

17 Claims, 5 Drawing Sheets

(56) References Cited

U.S. PATENT DOCUMENTS

| | | | |
|---|---|---|---|
| 5,406,492 A | 4/1995 | Suzuki | |
| 5,487,002 A | 1/1996 | Diller et al. | |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |
| 5,802,492 A | 9/1998 | DeLorme et al. | |
| 5,848,364 A | 12/1998 | Ohashi | |
| 5,901,806 A | 5/1999 | Takahashi | |
| 6,005,494 A | 12/1999 | Schramm | |
| 6,028,537 A | 2/2000 | Suman et al. | |
| 6,101,443 A | 8/2000 | Kato et al. | |
| 6,314,369 B1 | 11/2001 | Ito et al. | |
| 6,374,177 B1 | 4/2002 | Lee et al. | |
| 6,401,034 B1 | 6/2002 | Kaplan et al. | |
| 6,424,363 B1 | 7/2002 | Matsuba et al. | |
| 6,424,888 B1 | 7/2002 | Sone et al. | |
| 6,427,115 B1 | 7/2002 | Sekiyama | |
| 6,427,117 B1 | 7/2002 | Ito et al. | |
| 6,462,676 B1 | 10/2002 | Koizumi | |
| 6,484,092 B2 | 11/2002 | Seibel | |
| 6,484,093 B1 | 11/2002 | Ito et al. | |
| 6,487,477 B1 | 11/2002 | Woestman et al. | |
| 6,532,372 B1 | 3/2003 | Hwang | |
| 6,533,367 B1 | 3/2003 | Latamik et al. | |
| 6,574,538 B2 | 6/2003 | Sasaki | |
| 6,574,551 B1 | 6/2003 | Maxwell et al. | |
| 6,608,887 B1 | 8/2003 | Reksten et al. | |
| 6,691,025 B2 | 2/2004 | Reimer | |
| 6,791,471 B2 | 9/2004 | Wehner et al. | |
| 6,829,529 B2 | 12/2004 | Trefzer et al. | |
| 6,834,229 B2 | 12/2004 | Rafiah et al. | |
| 6,866,349 B2 | 3/2005 | Sauter et al. | |
| 6,904,362 B2 | 6/2005 | Nakashima et al. | |
| 6,999,779 B1 | 2/2006 | Hashimoto | |
| 7,053,866 B1 | 5/2006 | Mimran | |
| 7,082,443 B1 | 7/2006 | Ashby | |
| 7,089,110 B2 | 8/2006 | Pechatnikov et al. | |
| 7,113,107 B2 | 9/2006 | Taylor | |
| 7,167,799 B1 | 1/2007 | Dolgov et al. | |
| 7,243,134 B2 | 7/2007 | Bruner et al. | |
| 7,286,931 B2 | 10/2007 | Kawasaki | |
| 7,315,259 B2 | 1/2008 | Sacks | |
| 7,369,938 B2 | 5/2008 | Scholl | |
| 7,421,334 B2 * | 9/2008 | Dahlgren et al. | 701/117 |
| 7,486,199 B2 | 2/2009 | Tengler et al. | |
| 7,571,042 B2 | 8/2009 | Taylor et al. | |
| 7,626,490 B2 | 12/2009 | Kashima | |
| 7,642,901 B2 | 1/2010 | Kato et al. | |
| 7,653,481 B2 | 1/2010 | Tramel | |
| 7,706,796 B2 | 4/2010 | Rimoni et al. | |
| 7,726,360 B2 | 6/2010 | Sato et al. | |
| 7,804,423 B2 | 9/2010 | Mudalige et al. | |
| 7,818,380 B2 | 10/2010 | Tamura et al. | |
| 7,822,380 B2 | 10/2010 | Wu | |
| 7,822,546 B2 | 10/2010 | Lee | |
| 7,826,945 B2 | 11/2010 | Zhang et al. | |
| 7,848,867 B2 * | 12/2010 | Ueno | 701/70 |
| 7,894,592 B2 | 2/2011 | Book et al. | |
| 7,920,969 B2 | 4/2011 | Mudalige et al. | |
| 8,121,802 B2 | 2/2012 | Grider et al. | |
| 8,145,376 B2 | 3/2012 | Sherony | |
| 8,290,704 B2 | 10/2012 | Bai | |
| 2001/0001847 A1 | 5/2001 | Hessing | |
| 2002/0087262 A1 | 7/2002 | Bullock et al. | |
| 2002/0152018 A1 | 10/2002 | Duckeck | |
| 2003/0028320 A1 | 2/2003 | Niitsuma | |
| 2003/0036848 A1 | 2/2003 | Sheha et al. | |
| 2003/0040866 A1 | 2/2003 | Kawakami | |
| 2003/0040868 A1 | 2/2003 | Fish et al. | |
| 2003/0158652 A1 | 8/2003 | Friedrichs et al. | |
| 2004/0021583 A1 | 2/2004 | Lau et al. | |
| 2004/0117108 A1 | 6/2004 | Nemeth | |
| 2004/0117113 A1 | 6/2004 | Friedrichs et al. | |
| 2005/0085956 A1 | 4/2005 | Losey | |
| 2005/0144573 A1 | 6/2005 | Moody et al. | |
| 2005/0159881 A1 | 7/2005 | Furukawa | |
| 2006/0025923 A1 | 2/2006 | Dotan et al. | |
| 2006/0026335 A1 | 2/2006 | Hodgson et al. | |
| 2006/0069504 A1 | 3/2006 | Bradley et al. | |
| 2006/0089788 A1 | 4/2006 | Laverty | |
| 2006/0145837 A1 | 7/2006 | Horton et al. | |
| 2006/0168627 A1 | 7/2006 | Zeinstra et al. | |
| 2006/0172745 A1 | 8/2006 | Knowles | |
| 2006/0184314 A1 | 8/2006 | Couckuyt et al. | |
| 2006/0190164 A1 | 8/2006 | Glaza | |
| 2006/0241857 A1 | 10/2006 | Onishi et al. | |
| 2006/0282214 A1 | 12/2006 | Wolterman | |
| 2007/0005241 A1 | 1/2007 | Sumizawa et al. | |
| 2007/0038362 A1 | 2/2007 | Gueziec | |
| 2007/0050248 A1 | 3/2007 | Huang et al. | |
| 2007/0093955 A1 | 4/2007 | Hughes | |
| 2007/0104224 A1 | 5/2007 | Conner et al. | |
| 2007/0143013 A1 | 6/2007 | Breen | |
| 2007/0143482 A1 | 6/2007 | Zancho | |
| 2007/0143798 A1 | 6/2007 | Jira et al. | |
| 2007/0198172 A1 | 8/2007 | Sumizawa et al. | |
| 2007/0203643 A1 | 8/2007 | Ramaswamy et al. | |
| 2007/0203646 A1 | 8/2007 | Diaz et al. | |
| 2007/0213092 A1 | 9/2007 | Geelen | |
| 2007/0219706 A1 | 9/2007 | Sheynblat | |
| 2007/0273624 A1 | 11/2007 | Geelen | |
| 2007/0290839 A1 | 12/2007 | Uyeki et al. | |
| 2008/0005734 A1 | 1/2008 | Poristoin et al. | |
| 2008/0059022 A1 * | 3/2008 | Shimodaira et al. | 701/36 |
| 2008/0065318 A1 | 3/2008 | Ho | |
| 2008/0082260 A1 | 4/2008 | Kimura | |
| 2008/0114534 A1 | 5/2008 | Yamazaki et al. | |
| 2008/0147305 A1 | 6/2008 | Kawamata et al. | |
| 2008/0147308 A1 | 6/2008 | Howard et al. | |
| 2008/0162034 A1 | 7/2008 | Breen | |
| 2008/0195305 A1 | 8/2008 | Jendbro et al. | |
| 2008/0228346 A1 | 9/2008 | Lucas et al. | |
| 2008/0303693 A1 | 12/2008 | Link, II | |
| 2009/0055091 A1 | 2/2009 | Hines et al. | |
| 2009/0063042 A1 | 3/2009 | Santesson et al. | |
| 2009/0083627 A1 | 3/2009 | Onda et al. | |
| 2009/0143934 A1 | 6/2009 | Motonaga et al. | |
| 2009/0177384 A1 | 7/2009 | Walder | |
| 2009/0186596 A1 | 7/2009 | Kaltsukis | |
| 2009/0192688 A1 | 7/2009 | Padmanabhan et al. | |
| 2009/0196294 A1 | 8/2009 | Black et al. | |
| 2009/0216434 A1 | 8/2009 | Panganiban et al. | |
| 2009/0228172 A1 | 9/2009 | Markyvech et al. | |
| 2009/0254266 A1 | 10/2009 | Altrichter et al. | |
| 2009/0259354 A1 | 10/2009 | Krupadanam et al. | |
| 2009/0326797 A1 | 12/2009 | Tengler et al. | |
| 2009/0326801 A1 | 12/2009 | Johnson et al. | |
| 2010/0010732 A1 | 1/2010 | Hartman | |
| 2010/0048184 A1 | 2/2010 | Kim | |
| 2010/0088018 A1 | 4/2010 | Tsurutome et al. | |
| 2010/0088029 A1 | 4/2010 | Hu et al. | |
| 2010/0094500 A1 | 4/2010 | Jin | |
| 2010/0094550 A1 | 4/2010 | Tsurutome et al. | |
| 2010/0138151 A1 | 6/2010 | Jang et al. | |
| 2010/0174485 A1 | 7/2010 | Taylor et al. | |
| 2010/0191463 A1 | 7/2010 | Berry et al. | |
| 2010/0198508 A1 | 8/2010 | Tang | |
| 2010/0217482 A1 | 8/2010 | Vogel et al. | |
| 2010/0241342 A1 | 9/2010 | Scalf et al. | |
| 2010/0245123 A1 | 9/2010 | Prasad et al. | |
| 2011/0003578 A1 | 1/2011 | Chen et al. | |
| 2011/0004523 A1 | 1/2011 | Giuli et al. | |
| 2011/0028118 A1 | 2/2011 | Thomas | |
| 2011/0046883 A1 | 2/2011 | Ross et al. | |
| 2011/0166774 A1 | 7/2011 | Schunder et al. | |
| 2011/0178811 A1 | 7/2011 | Sheridan | |
| 2011/0221586 A1 | 9/2011 | Eikelenberg et al. | |
| 2011/0238289 A1 | 9/2011 | Lehmann et al. | |
| 2011/0246016 A1 * | 10/2011 | Vang et al. | 701/29 |
| 2011/0255481 A1 | 10/2011 | Sumcad et al. | |
| 2012/0004841 A1 | 1/2012 | Schunder | |
| 2012/0029760 A1 * | 2/2012 | Murakami et al. | 701/29 |
| 2012/0029806 A1 | 2/2012 | Scalf et al. | |

(56) References Cited

U.S. PATENT DOCUMENTS

| | | | |
|---|---|---|---|
| 2012/0029807 | A1 | 2/2012 | Schunder et al. |
| 2012/0041673 | A1 | 2/2012 | Vandivier et al. |
| 2012/0053825 | A1 | 3/2012 | Schunder |
| 2012/0173134 | A1 | 7/2012 | Gutman |
| 2012/0221228 | A1* | 8/2012 | Noumura et al. ............. 701/110 |
| 2012/0240564 | A1* | 9/2012 | Wesolowski et al. ........... 60/327 |
| 2013/0030630 | A1 | 1/2013 | Luke et al. |

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |
| WO | 2008037471 | 4/2008 |

OTHER PUBLICATIONS

International Searching Authority, The International Search Report and the Written Opinion of the International Searching Authority for the corresponding International Application No. PCT/US2010/23887 mailed Apr. 12, 2010.

Patent Cooperation Treaty, International Preliminary Examining Authority, International Preliminary Report on Patentability for the corresponding PCT/US10/23887 mailed Apr. 29, 2011.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

POI Along Route Qs, Printed from http://www.tomtomforums.com, printed Jul. 30, 2010.

Difficult POI search in Streets & Trips, printed from http://www.laptopgpsworld.com/3520-difficult-poi-search-streets-tips, printed Jul. 30, 2010.

http://www.rated4stars.com/html/gps-saves-gas.html.

http://www.gps.cx/index.php?c=1&n=493964&i=B001LTHONU&x=GPS_Buddy_FE01US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

* cited by examiner

METHOD AND APPARATUS FOR DETERMINING TRAFFIC CONDITIONS

TECHNICAL FIELD

The illustrative embodiments generally relate to a method and apparatus for determining traffic conditions.

BACKGROUND

Drivers are used to an array of connected services. Utilizing in-vehicle connected systems, such as navigation systems and/or infotainment systems, which can connect with remote servers, drivers can obtain a wealth of information. This can include entertainment, driving information and even weather and traffic information. Driving directions, for example, can be provided based on best routes, most efficient routes and even routes with decreased traffic.

Of course, sometimes traffic information may not be available due to connection issues or lack of a subscription to a traffic service. Also, traffic information may be based on dated information.

U.S. Pat. No. 7,421,334 generally relates to an on-board intelligent vehicle system including a sensor assembly to collect data and a processor to process the data to determine the occurrence of at least one event. The data may be collected from existing standard equipment such as the vehicle communication bus or add-on sensors. The data may be indicative of conditions relating to the vehicle, roadway infrastructure, and roadway utilization, such as vehicle performance, roadway design, roadway conditions, and traffic levels. The detection of an event may signify abnormal, substandard, or unacceptable conditions prevailing in the roadway, vehicle, or traffic. The vehicle transmits an event indicator and correlated vehicle location data to a central facility for further management of the information. The central facility sends communications reflecting event occurrence to various relevant or interested users. The user population can include other vehicle subscribers (e.g., to provide rerouting data based on location-relevant roadway or traffic events), roadway maintenance crews, vehicle manufacturers, and governmental agencies (e.g., transportation authorities, law enforcement, and legislative bodies)

U.S. Application Publication 2008/303693 generally relates to an automatic traffic reporting system comprising a vehicle mounted data transceiver (telematics device) and centrally operated information collectors and analyzers that generate real time traffic reports for selected areas of interest.

U.S. Application Publication 2009/192688 generally relates to a traffic sensing system for collecting information on traffic conditions. A traffic sensing system includes a traffic sensing server and a mobile traffic sensing device that sends traffic reports to the traffic sensing server. An MTS device may use an accelerometer integrated into a smart phone to detect potholes, to detect when the vehicle is braking, to detect whether the MTS device is being transported via a vehicle or a pedestrian, to detect horns sounding, and so on. The MTS device reports the various conditions to the traffic sensing server for accurate assessment of traffic conditions at stretches of road through which vehicles transporting MTS devices travel.

U.S. Application Publication 2011/246016 generally relates to a method of displaying traffic on a display within a vehicle may include monitoring a current vehicle speed, monitoring external traffic data by various methods, determining if a brake is applied for at least a predetermined time period, determining if the vehicle is a predetermined distance from a traffic signal that the vehicle is approaching, determining that a traffic event exists on a road upon which the vehicle is traveling, inquiring if traffic cameras exist on the road upon which the vehicle is traveling, and displaying traffic data on a display within the vehicle that corresponds to the road ahead upon which the vehicle is traveling. The method may include determining if the vehicle speed is maintained at a speed less than the posted speed for a predetermined time period. The display may display traffic data captured by the traffic cameras, downloaded from remote servers, or communicated directly from another vehicle.

SUMMARY

In a first illustrative embodiment, a system includes a vehicle processor configured to detect one or more brake presses. The processor is also configured to detect one or more accelerator presses. Further, the processor is configured to add values related to the brake presses and accelerator presses to aggregate an index value based on detected brake and acceleration presses. The processor is additionally configured to enact a safety and convenience related measure based on the index value passing at least a first predetermined threshold.

In a second illustrative embodiment, a computer-implemented method includes detecting one or more brake presses. The method also includes detecting one or more accelerator presses. Further, the method includes adding values related to the brake presses and accelerator presses to aggregate an index value based on detected brake and acceleration presses. The method additionally includes enacting a safety and convenience related measure based on the index value passing at least a first predetermined threshold.

In a third illustrative embodiment, a non-transitory computer-readable storage medium stores instructions that, when executed by a processor, cause the processor to perform a method including detecting one or more brake presses. The method also includes detecting one or more accelerator presses. Further, the method includes adding values related to the brake presses and accelerator presses to aggregate an index value based on detected brake and acceleration presses. The method additionally includes enacting a safety and convenience related measure based on the index value passing at least a first predetermined threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
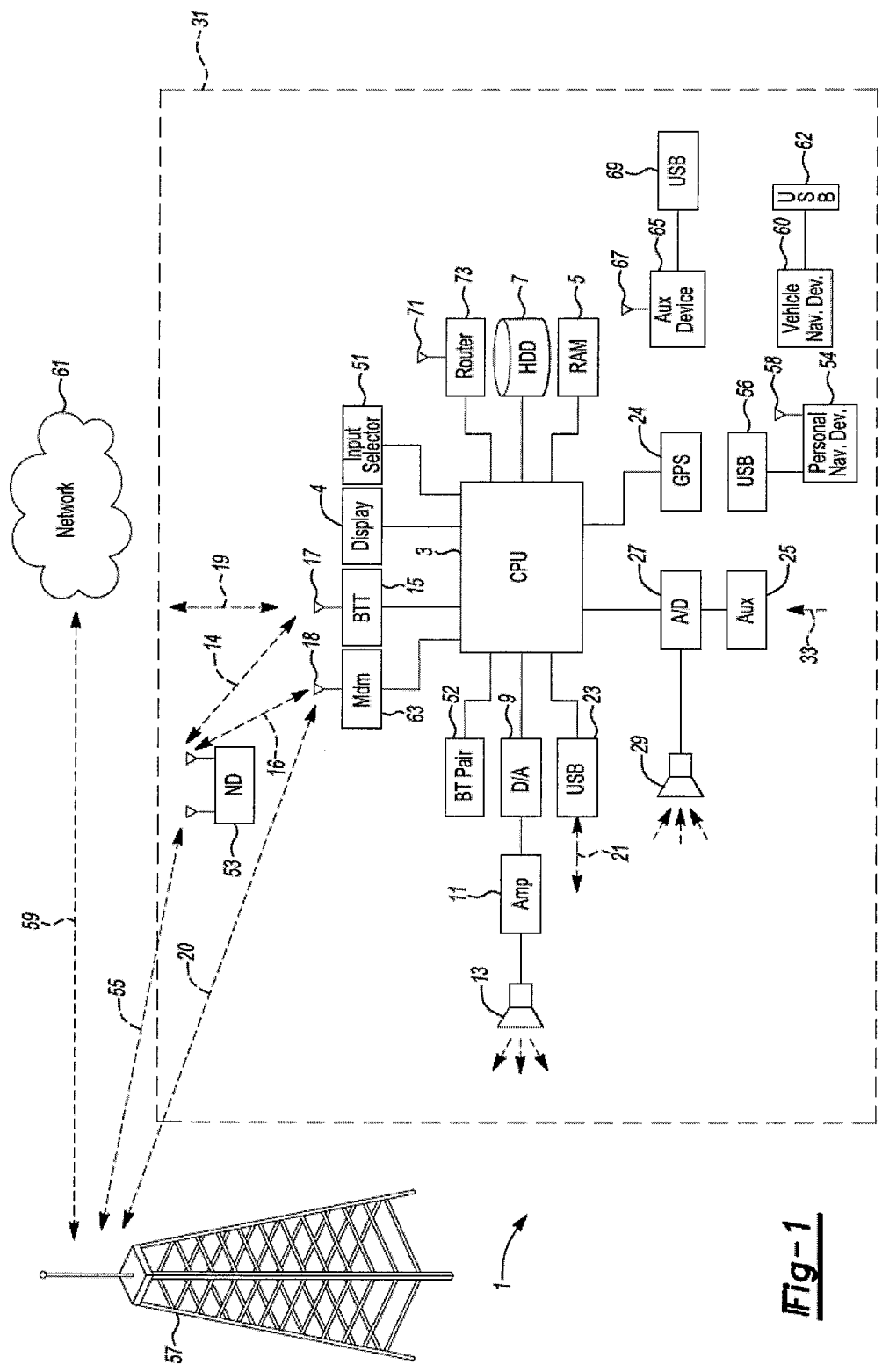
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Assessment of the driving-attention demand is of particular value to assist in modulating communication, recommendations and vehicle system interaction with the driver. OEMs are actively designing ways to further simplify driver's time behind the wheel, with systems that anticipate and assist driver attention. Traffic concentration is of interest because it increases the driving-demand/workload for drivers. Information about traffic flow conditions may be available through digital electronics and connected services, or can be detected with additional sensors (camera, radar, etc.). Those services and sensors may not be widely available across vehicle platforms, however. An intelligent estimation of the traffic congestion based on driver actions provides opportunities to further customize VCS information management and driver communication, according to the illustrative embodiments.

The illustrative embodiments present new systems and methods for driver action based traffic estimation for personalizing VCS information interaction. The illustrative embodiments discuss using driver acceleration and brake pedal actuation patterns to estimate traffic conditions. During increased traffic conditions, driving patterns frequently involve pressing and switching between acceleration and braking. The switching of pedal states is computed over time to estimate the traffic states. Components of an exemplary system include: driver action input, driver action diagnosis, traffic states, traffic state fusion and personalized driver communication. This can assist in providing a continuous index value indicative of the assessment of the traffic conditions in front of the vehicle while driving. This solution can also work with all vehicles, since all vehicles have brakes and acceleration pedals.

This real time computational approach is based on observed driver actions. Some embodiments include a specialized exponential decay scheme, with tunable moving windows for enumerating pedal actuation and characterizing traffic states. This can also be fused or aggregated with additional traffic information to produce an overall value for VCS information management.

Figure 2:
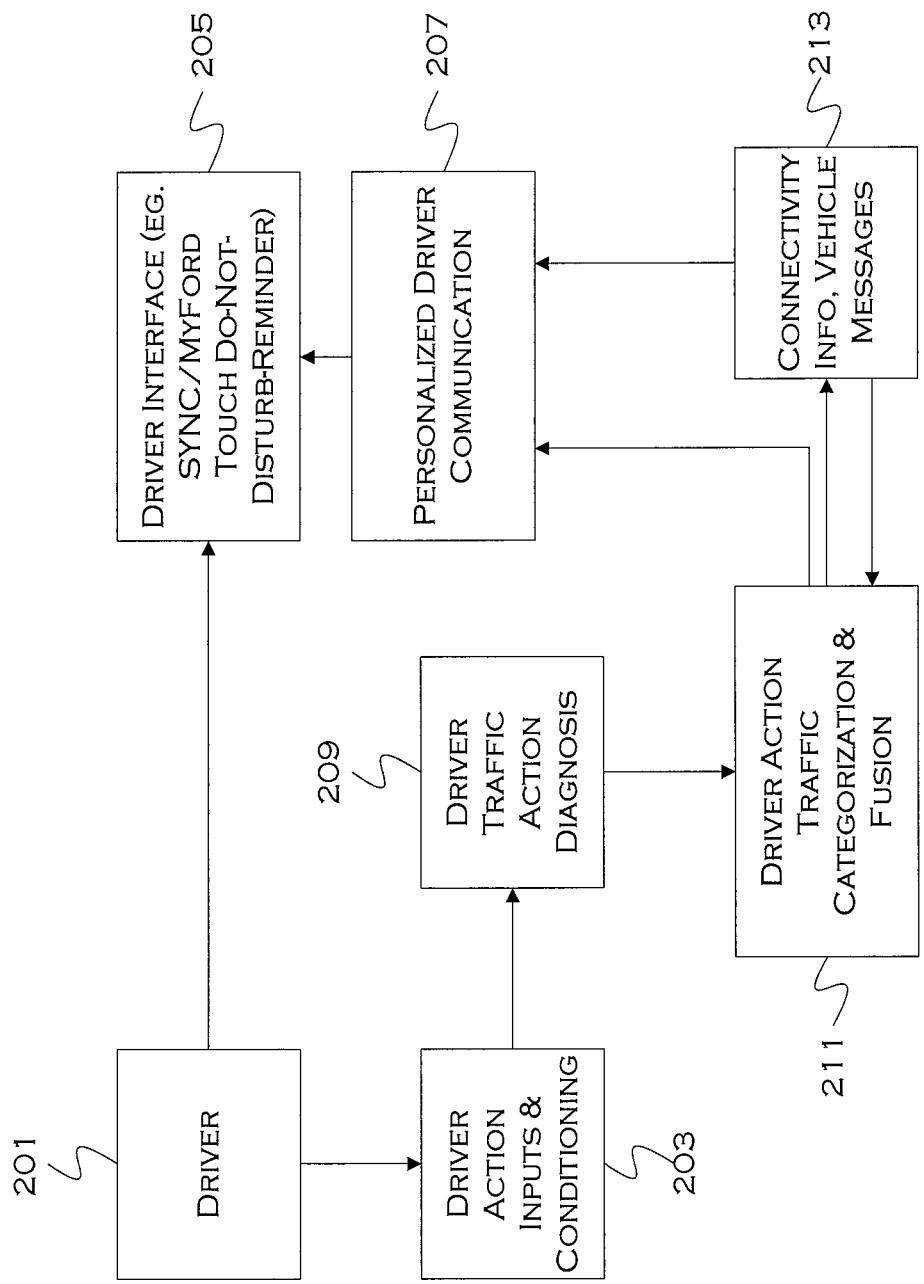
FIG. 2 shows an illustrative driver monitoring system.

FIG. 2 shows an illustrative driver monitoring system. In this illustrative example, a driver 201 interacts with both a driver interface 205 and provides inputs 203. The driver interface can include, but is not limited to, hands-free calling, navigation, infotainment services, etc. The inputs, in this embodiment, include both brakes and acceleration pedals.

Based on the driver inputs, a traffic diagnosis module 209 can aid in assessment of traffic conditions. Once the traffic state has been characterized, the process can fuse or aggregate the model with other vehicle systems and services 211. Personalized driver communication can be provided based on the observed state of traffic 207. Also, connectivity and vehicle messages can be provided 213.

In one model representative of traffic, useful for understanding the illustrative embodiments, the following assumptions are made. These are for illustrative purposes only:

1) The deviation of headway distance is highly correlated to the traffic flow in front of the vehicle;

2) To maintain safe headway distance, drivers will press and switch between pedals;

3) The traffic congestion can be estimated by enumerating the number of pedals pressed and switched during pre-defined time durations; and 4) The time duration is a tuning variable. A longer observation time sets a longer duration for traffic congestion estimation and vice versa.

Both acceleration and braking may be observed. A binary signal takes the value 1 when (in one illustrative example) the brake pedal is pressed or when the acceleration pedal is pressed. Pedal pressing and switching are then enumerated. When either pedal is pressed, a function receiving the positive excitation increases the Index value progressively. The index value can be increased in the following exemplary ways: it can increase by a tunable value $\delta_1$—if the same pedal is pressed; and the index value can increase by a tunable value $\delta_2$ if pedals are switched.

Figure 3:
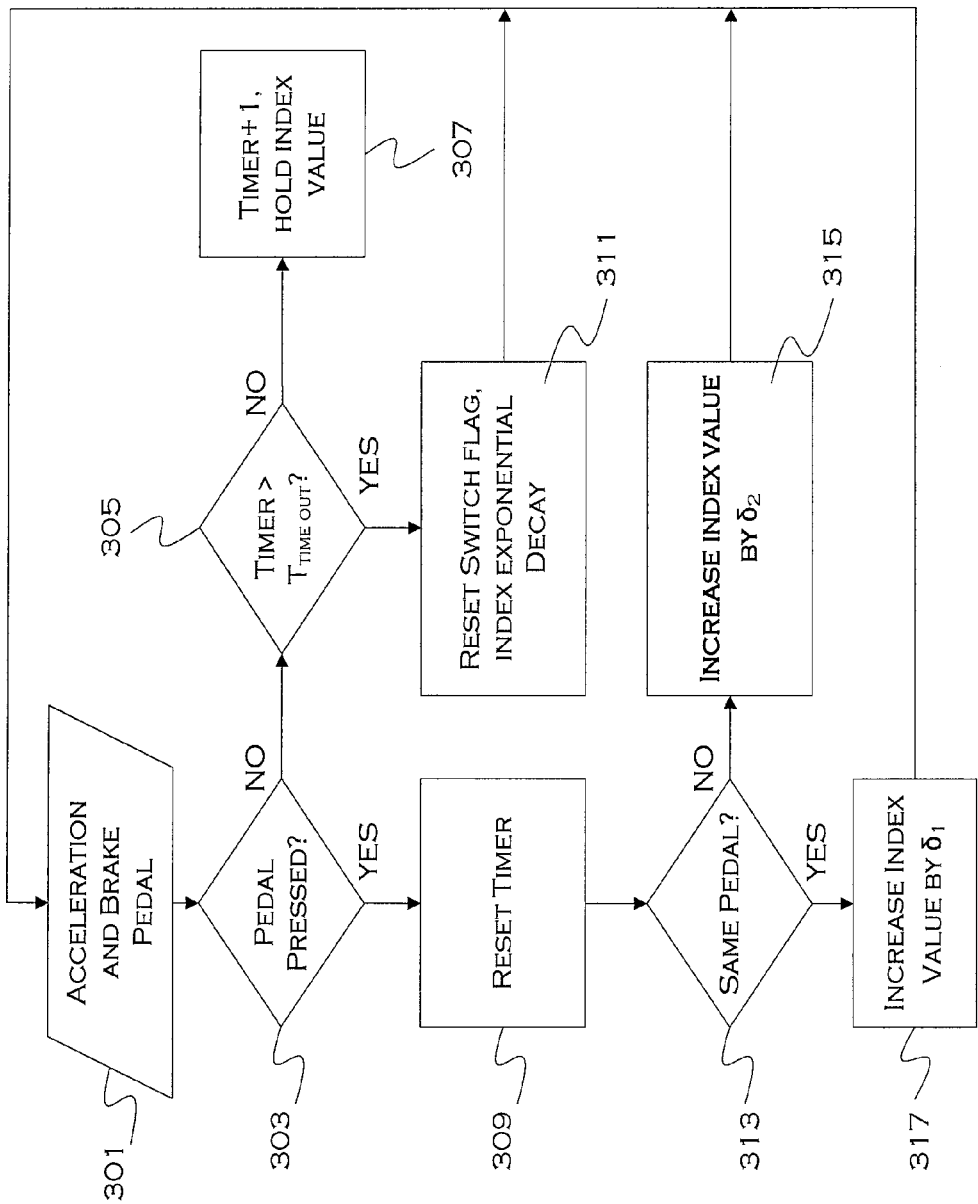
FIG. 3 shows an illustrative process for driver monitoring.

If no pedal is pressed, a timer may start. The index will hold the same value until the timer reaches a timeout state. After the timeout, the indexes decay exponentially with a tunable time constant. The timer is reset whenever the pedal is pressed. FIG. 3 shows an illustrative process for driver monitoring.

In this illustrative embodiment, the process monitors input from the acceleration or the brake pedal 301. If either pedal is pressed 303, the process resets a timer 309. This tracks rapid pedal pressing, which is demonstrative of a likely traffic condition. If the same pedal has been pressed, the index value can be increased by $\delta_1$ 317. If a different pedal is pressed (i.e., the same pedal is not pressed twice in succession), the process can increase the index value by $\delta_2$. The process can then return to detecting input.

If no pedal is pressed when a pedal detection state is checked, the process will start a timer 305. If the timer 305 is not greater than a timeout value, the process will increment the timer 307 and hold a current index value. This allows for some time between pedal presses. If the timer has reached a timeout state, the switch flag may be reset and the index may be decayed by some exponential amount, to indicate a period of low traffic.

The timer assists in keeping the index value unchanged for a period of time, known as the timeout period. Subsequent pedal actuation would then raise the index value higher, representing higher congestion.

Figure 4:
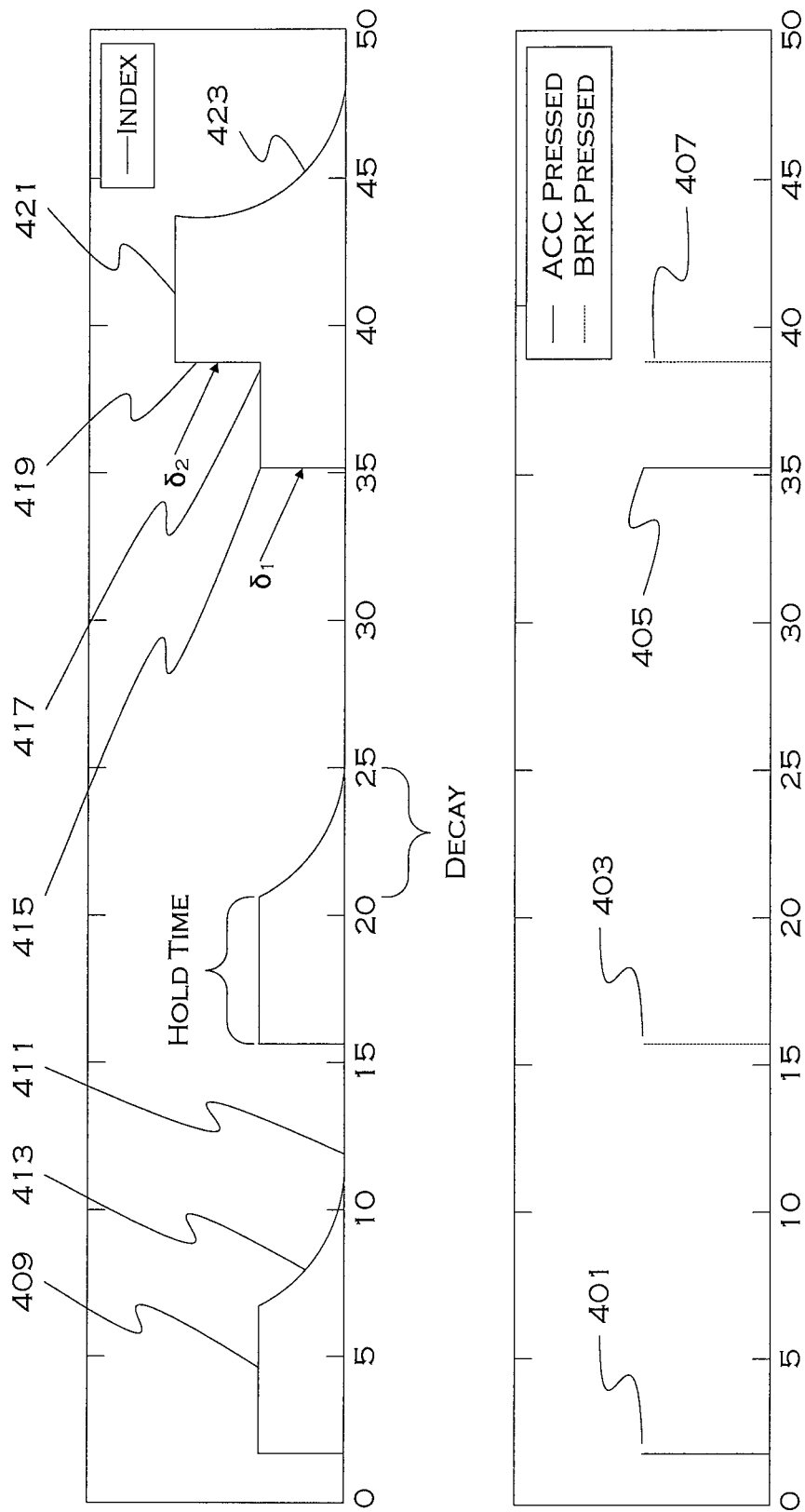
FIG. 4 shows an illustrative example of break and acceleration measurement.

FIG. 4 shows an illustrative example of break and acceleration measurement. The index value shows the incremental index and the decremental exponential decay of an exemplary system. The values shown below the index values show the incidents of braking and acceleration.

As can be seen at 401, an acceleration event (i.e., acceleration pedal) has occurred. This results in an uptick of the index to level 409. Then as time passes and no event occurs, the decay 413 begins until a baseline is again achieved. At 403, a brake event occurs and the index value again jumps. For the duration of the hold time, the process maintains the index value, until the decay again kicks in because no event occurs.

Finally, in this example, another acceleration 405 and brake event 407 occur, this time in close proximity to another. Here, there is an uptick to the first level at 415, corresponding to the acceleration event. This time, the timer 417 is not sufficient to spark decay, before the brake event occurs. At that point, there is a greater jump 419 in the index value, since there was a switch between acceleration and braking.

The value then maintains at 421 over the timeout period. Since no other event occurs, the process then decays the index value 423 until a baseline is reached.

Once an index value has been obtained, the VCS can utilize the index values to facilitate occupant messaging and warning states. In another instance, the VCS can use the values to determine points of likely driving-attention demand. Since high traffic levels can commonly correspond to levels of high driving-attention, the process can utilize the braking and acceleration information to determine likely points of driving-attention demand based on traffic.

Figure 5:
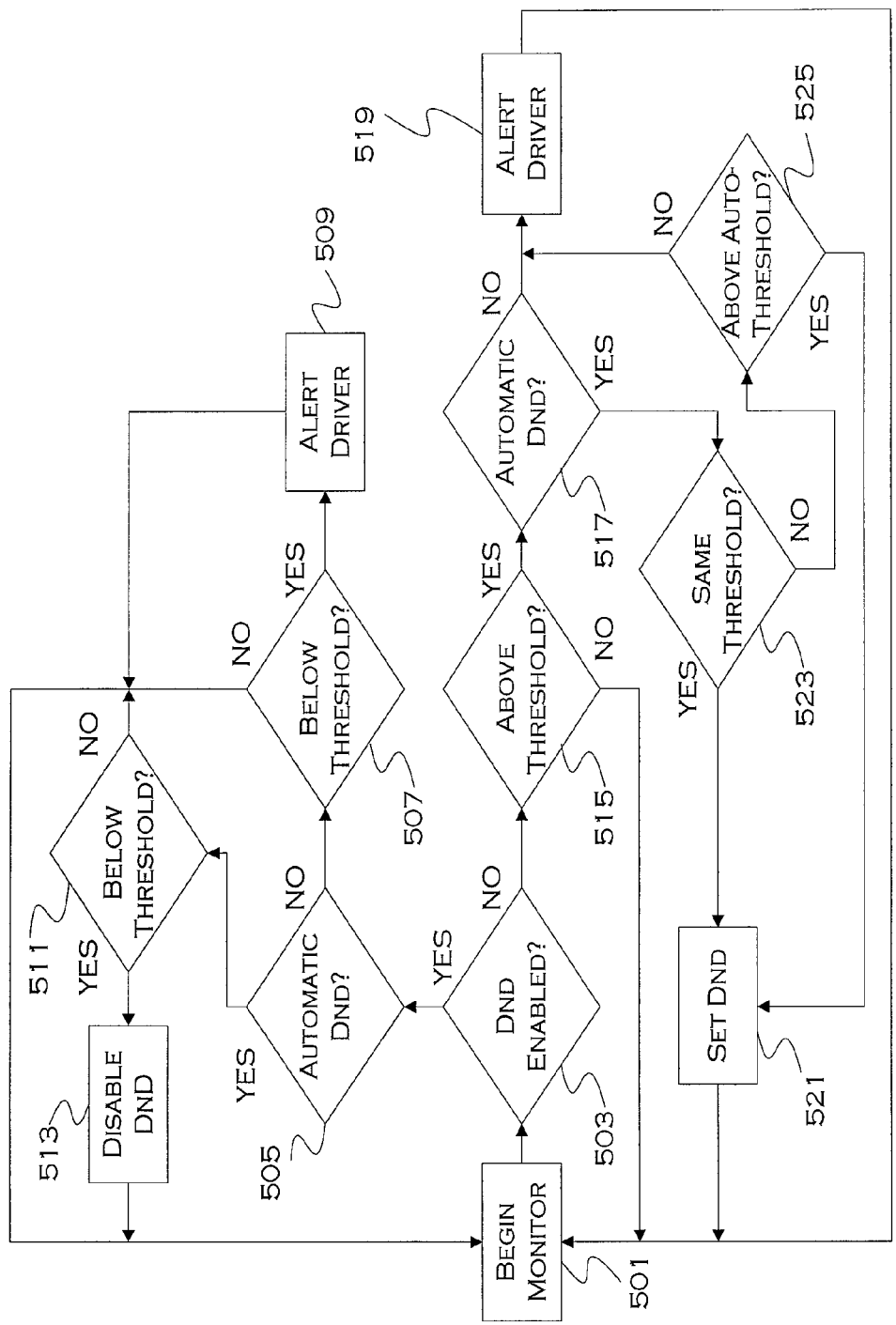
FIG. 5 shows an illustrative example of a monitoring and driver action recommendation process.

FIG. 5 shows an illustrative example of a monitoring and driver action recommendation process. In this illustrative example, a vehicle equipped with the monitoring embodiments described herein, or similar embodiments, can begin monitoring for incidents of frequent braking and acceleration 501.

In this illustrative example, a do not disturb (DND) state will be enabled, disabled or recommended based on observed traffic conditions. The do not disturb state will allow a driver to ignore incoming calls and application messages, or to selectively respond to such messages. Although a DND state is used as an exemplary incident of a vehicle messaging, convenience and safety state, any feature relating to safety and convenience under high incidences of driver attention demand can be implemented. Additionally or alternatively, traffic related protocols can be engaged. In one model, the system can even be used for traffic measuring and reporting in a crowd-sourced paradigm.

Once the monitoring has begun, the process determines if a do not disturb state has been enabled 503. If the do not disturb state is already enabled, the process may determine if the state was enabled automatically or based on a driver setting 505. In the cases where the state was automatically enabled, the process may be equipped to also automatically disable the state when traffic incidences are lower than at an enabled point.

In this case, there is a threshold point at which the do not disturb state was enabled. If the index value drops below the threshold value 511, and the process automatically enabled the do not disturb state, then the process can subsequently disable a do not disturb state 513. The monitoring may then continue.

On the other hand, if the do not disturb state was manually enabled 505 the process still checks to see if the index value is below the threshold 507. If the index value is below the threshold and the driver manually enabled the do not disturb state, the process may alert the driver that it may be safe to disable a do not disturb state 509. A timer may also be involved in such notification, as with the notification to enable the state, so that the driver is not constantly bothered with messages to switch in and out of the do not disturb state (or other relevant messages).

If the do not disturb feature is not enabled while the monitoring is ongoing, the process may check to see if the index value is above a given threshold 515. If the index value has not risen above the threshold, and the do not disturb state is not enabled, the monitoring may continue until the index value passes the threshold.

Once the index value passes the threshold, the process determines if an automatic do not disturb feature is present 517. Under such a feature, the do not disturb state can be automatically enabled when the index value passes a threshold. In at least one instance, there is a warning threshold and an enablement threshold, such that under lower index values above a first threshold a warning is just provided, whereas under higher index values above a second threshold the automatic state kicks in.

In at least one case, if the automatic processing is enabled, the automatic turn-on value may be the same value as the baseline threshold 523. If this is the case, and the threshold is exceeded, the do not disturb state is set. In another instance, the process may have a secondary threshold for automatic enablement. If the secondary threshold is not met 525, or if the automatic do not disturb is not enabled, the process may merely alert the driver. Otherwise, if the threshold is met, the process may enable a do not disturb state automatically.

As previously noted, the automatic enablement of features may extend beyond do not disturb states. Any appropriate safety or other protocol may be enabled, disabled or recommended based on an observed traffic state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a vehicle processor configured to:
   detect a brake press;
   detect an accelerator press;
   add values related to the brake press and accelerator press to aggregate an index value based on detected brake and acceleration presses, including adding a first value based on a first brake or acceleration press, when the index value is zero; and
   enact a safety or convenience related measure based on the index value passing a first predetermined threshold.

2. The system of claim 1, wherein the processor is configured to add a first value based on successive brake or acceleration presses, wherein multiple brake presses or acceleration presses occur in succession.

3. The system of claim 1, wherein the processor is configured to add a second value based on a brake press following an acceleration press or an acceleration press following a brake press.

4. The system of claim 1, wherein the processor is further configured to:
   implement a timer;
   increment the timer until a time limit is reached; and
   upon reaching the time limit; exponentially decay the index value.

5. The system of claim 4, wherein the processor is further configured to reset the timer if an acceleration or brake pedal is pressed before the time limit is reached.

6. The system of claim 4, wherein the processor is further configured to interrupt the exponential decay, and increase the index value, if an acceleration or brake pedal is pressed before the index value reaches zero.

7. A computer-implemented method comprising:
    detecting a brake press;
    detecting an accelerator press;
    adding values related to the brake press and accelerator press to aggregate an index value based on detected brake and acceleration presses;
    enacting a safety or convenience related measure based on the index value passing a first predetermined threshold;
    implementing a timer, incremented until a time limit is reached; and
    exponentially decaying the index value at the time limit.

8. The method of claim 7, wherein the adding further comprises adding a first value based on a first brake or acceleration press, when the index value is zero.

9. The method of claim 8, wherein the adding further comprises adding a first value based on successive brake or acceleration presses, wherein multiple brake presses or acceleration presses occur in succession.

10. The method of claim 8, wherein the adding further comprises adding a second value based on a brake press following an acceleration press or an acceleration press following a brake press.

11. The method of claim 7, further including resetting the timer if an acceleration or brake pedal is pressed before the time limit is reached.

12. The method of claim 7, further including interrupting the exponential decay, and increasing the index value, if an acceleration or brake pedal is pressed before the index value reaches zero.

13. A non-transitory computer-readable storage medium, storing instructions that, when executed by a processor, cause the processor to perform a method comprising:
    detecting a brake press;
    detecting an accelerator press;
    adding values related to the brake press and accelerator press to aggregate an index value based on detected brake and acceleration presses;
    enacting a safety or convenience related measure based on the index value passing at least a first predetermined threshold;
    implementing a timer, incremented until a time limit is reached; and
    exponentially decaying the index value at the time limit.

14. The storage medium of claim 13, wherein the adding further comprises adding a first value based on a first brake or acceleration press, when the index value is zero.

15. The storage medium of claim 14, wherein the adding further comprises adding a first value based on successive brake or acceleration presses, wherein multiple brake presses or acceleration presses occur in succession.

16. The storage medium of claim 14, wherein the adding further comprises adding a second value based on a brake press following an acceleration press or an acceleration press following a brake press.

17. The storage medium of claim 13, further including resetting the timer if an acceleration or brake pedal is pressed before the time limit is reached.

* * * * *